United States Patent
Possin et al.

[11] Patent Number: 6,167,110
[45] Date of Patent: Dec. 26, 2000

[54] HIGH VOLTAGE X-RAY AND CONVENTIONAL RADIOGRAPHY IMAGING APPARATUS AND METHOD

[75] Inventors: Gerorge Edward Possin, Niskayuna, N.Y.; Andrew Joseph Galish, West Chester; Ralph Gerald Isaacs, Cincinnati, both of Ohio; Douglas Albagli, Clifton Park; Ching-Yeu Wei, Niskayuna, both of N.Y.; Thomas William Birdwell, Middletown; Francis Howard Little, Cincinnati, both of Ohio; Sung Su Han, Niskayuna, N.Y.

[73] Assignee: General Electric Company, Schenectady, N.Y.

[21] Appl. No.: 08/963,519

[22] Filed: Nov. 3, 1997

[51] Int. Cl.[7] ...................................................... H05G 1/60
[52] U.S. Cl. ........................ 378/19; 250/370.11; 378/98.8
[58] Field of Search ........................... 378/19, 98.3, 98.8; 250/370.11, 366

[56] References Cited

U.S. PATENT DOCUMENTS

| | | |
|---|---|---|
| 4,303,860 | 12/1981 | Bjorkholm ............................. 250/366 |
| 4,317,037 | 2/1982 | Suzuki et al. ...................... 250/370.11 |
| 4,560,882 | 12/1985 | Barbaric et al. .................... 250/370.11 |
| 5,008,547 | 4/1991 | Molteni et al. ......................... 250/98.3 |
| 5,144,141 | 9/1992 | Rougeot et al. .......................... 250/369 |
| 5,231,654 | 7/1993 | Kwasnick et al. ....................... 378/147 |
| 5,231,655 | 7/1993 | Wei et al. ................................. 378/147 |
| 5,293,417 | 3/1994 | Wei et al. ................................. 378/147 |
| 5,303,282 | 4/1994 | Kwasnick et al. ....................... 378/147 |
| 5,430,298 | 7/1995 | Possin et al. ............................. 250/370 |

*Primary Examiner*—Craig E. Church
*Attorney, Agent, or Firm*—Donald S. Ingraham; Douglas E. Stoner

[57] ABSTRACT

A detector (20) for high voltage x-rays includes a plurality of sensor elements (22) with each sensor element being aligned along a respective focal axis (25) with respect to a high voltage x-ray source (24). A fiber optic scintillator (34) is optically coupled to each of said sensor elements and is disposed to receive incident x-ray radiation passing from the object to be imaged. Optical fibers of the scintillator are positioned such that their optical axes are perpendicular to incident x-rays. Each sensor element has a length along the focal axis sufficiently long for the fibers to absorb substantially all incident x-rays. Each sensor element comprises an array of amorphous silicon photosensors disposed to detect light generated by the scintillator.

21 Claims, 8 Drawing Sheets

HIGH VOLTAGE X-RAY AND CONVENTIONAL RADIOGRAPHY IMAGING APPARATUS AND METHOD

BACKGROUND OF THE INVENTION

1. Field of the Invention

This invention relates generally to radiation imaging systems and in particular to high voltage x-ray radiography imaging systems.

2. Discussion of the Prior Art

X-ray computed tomography (CT) has been used for the non-destructive determination of the interior features of objects. While typical medical computed tomography systems operate at or below a peak voltage of 120 kilovolts, computed tomography systems for industrial uses often operate at a peak voltage of 400 kilovolts or greater. As used herein, "peak voltage" or the like refers to the maximum energy of the accelerated electrons producing the x-rays. Such high voltages are required for the x-rays to penetrate large and high density objects. It is desirable for the x-ray detectors used in these high voltage industrial applications to absorb high energy x-rays and to provide high resolution for the measurement of wall thicknesses, distortions, and defects.

One type of detector for high voltage x-rays utilizes modules of photosensitive diode arrays. Each module contains sixteen single crystal diodes with the diodes arranged parallel to one another. The spacing between each diode is 1 mm. The diode modules are oriented with the diode edges normal to the incident x-ray. Each module is then focally aligned with the x-ray source. Lumex, a solid state scintillator without light guiding properties, is commonly used for converting incident x-rays to visible light. This detector configuration, using modules of parallel edge-on photosensitive diodes, is limited to a resolution of 0.5–1.0 lp/mm, because of limitations of the scintillator and diode technology.

A second type of x-ray detector is a xenon (Xe) detector. Charge is generated by the absorption of x-rays in highly pressurized xenon gas. The generated charge is collected by a high voltage applied to an electrode, and an output signal is read out of patterned electrodes. Since this xenon detector experiences electron and x-ray scattering within the relatively low density xenon gas, the detector is limited to a resolution of about 2.8 lp/mm.

None of the aforementioned x-ray detectors has sufficiently high resolution to produce a desired attenuation map of the interior of a solid object.

SUMMARY OF THE INVENTION

In accordance with the invention, a high resolution and robust detector for high voltage x-rays includes a plurality of sensor elements, with each sensor element having an axis focally aligned with a high voltage x-ray source. Each sensor element comprises a plurality of photosensors arranged in an array corresponding with the focal axis of the sensor element. The detector further comprises a scintillator that is disposed to receive incident x-rays and that is optically coupled to the array of photosensors so as to provide high resolution detection of the incident radiation. One means for providing high resolution detection is use of a fiber optic scintillator in which the optical fibers are positioned such that the optical axes of the fibers are generally disposed perpendicular to the path of incident x-rays. Each sensor element typically is sized to have a length along the focally aligned axis that corresponds to a distance in the scintillator in which the fibers absorb most of the high voltage x-rays. The photosensors produce respective output signals that are proportional to the intensity of the light generated in regions of the scintillator where the high voltage x-rays are absorbed.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
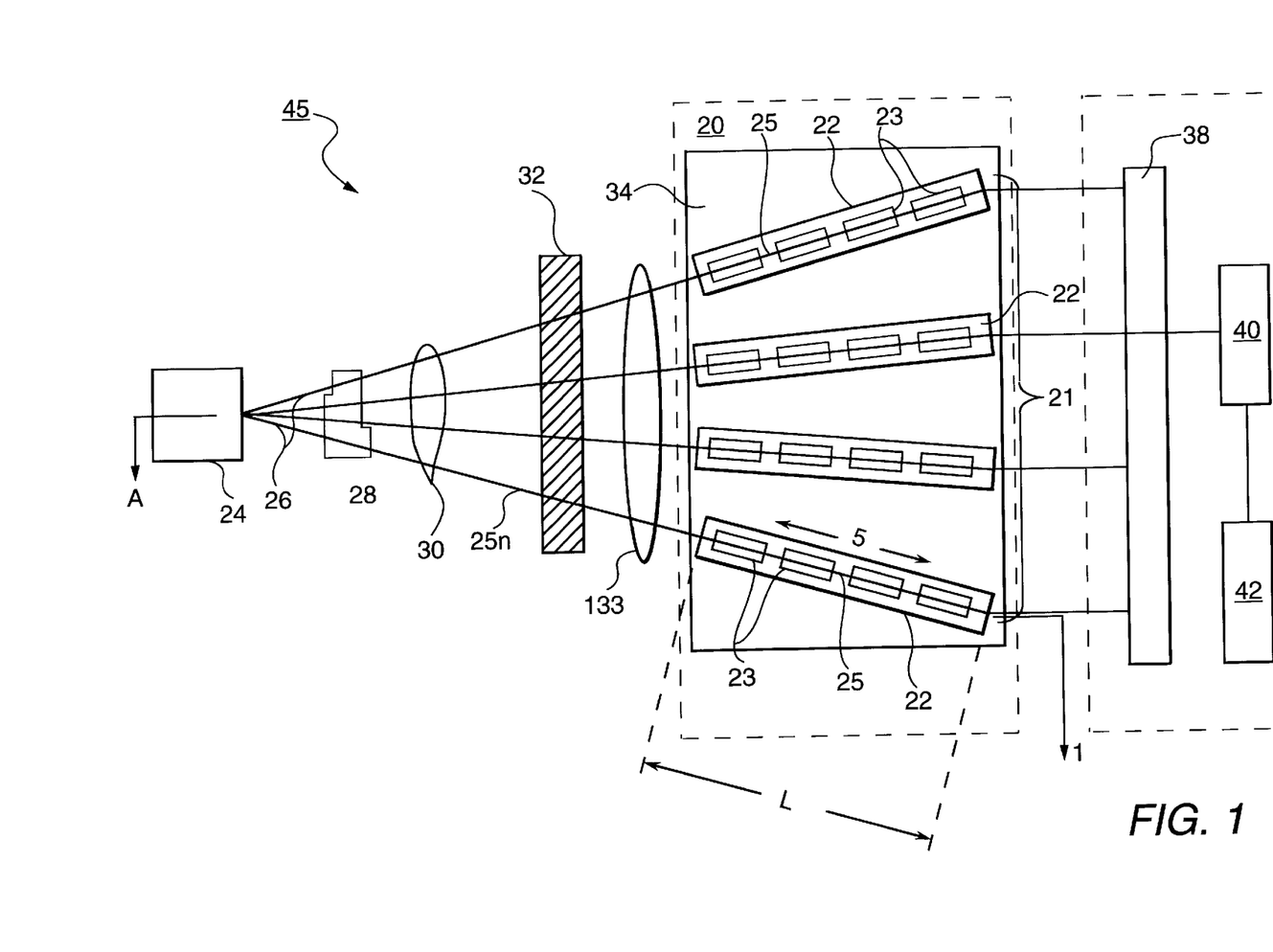
FIG. 1 is a top view-block diagram of an imaging apparatus in accordance with one embodiment of the present invention.

A robust and high resolution imager apparatus 45 in accordance with the present invention comprises an x-ray source 24 and an x-ray detector 20 (FIG. 1). X-ray detector 20 comprises a scintillator 34 optically coupled to an array 21 of sensor elements 22. Detector 20 is disposed to receive incident x-rays that have passed through an object 28 that is to be imaged. Imager 45 in one embodiment further comprises a collimator 32 disposed so that x-rays exiting from object 28 pass through the collimator before striking scintillator 34. The light generated by the absorption of incident x-rays in scintillator 34 is detected by the array of sensor elements 22 which in turn generate an electrical signal corresponding to the incident xrays. Imager apparatus 45 is typically used for generation of computed tomography (CT) images of the object to be imaged.

Figure 2:
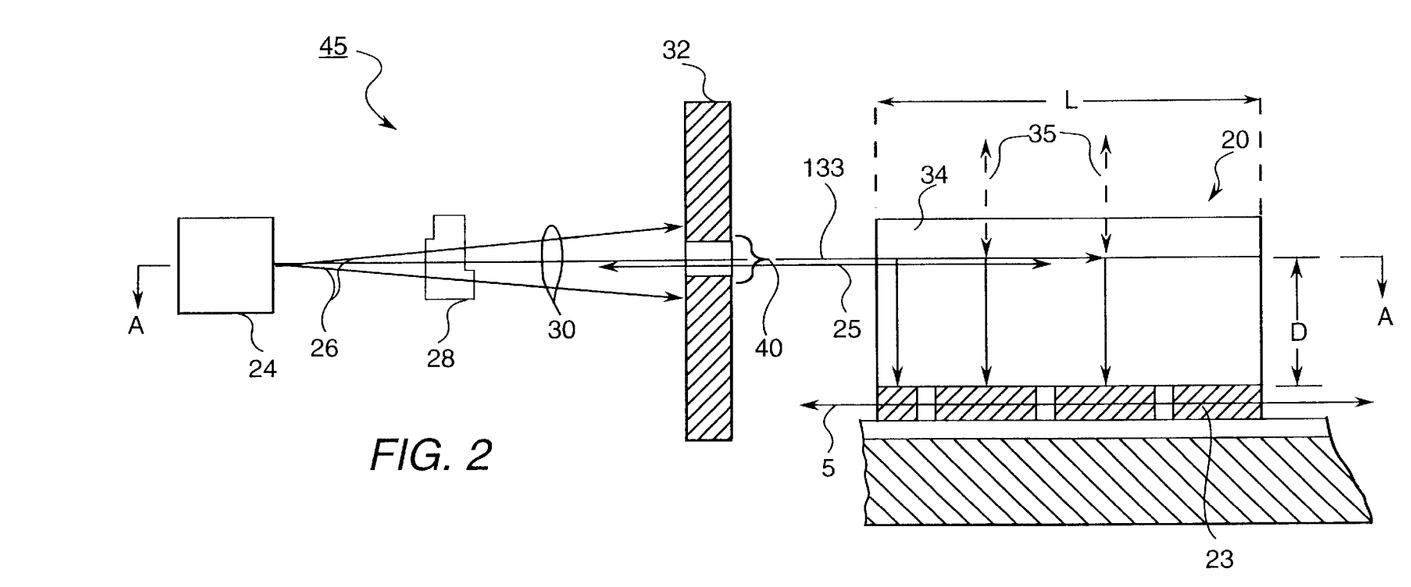
FIG. 2 is a sectional view along line A—A of FIG. 1 showing the structure of a sensor and a collimator.

For example, in one embodiment, detector 20 comprises over one thousand sensor elements disposed in a pattern (e.g., the arrangement of array 21 in FIG. 1), which illustrates a few representative sensor elements 22. Each sensor element 22 typically comprises a plurality of photosensors 23 disposed in a linear array pattern (that is, each photosensor in the sensor element 22 is disposed adjacent at least one other photosensor and is aligned along a sensor element axis 5 corresponding to the longitudinal dimension of the sensor element, e.g., a respective focal axis 25) such that all photosensors in sensor element 22 are aligned similarly with respect to an x-ray source 24. Each sensor elements 22 has a respective focal alignment axis with respect to the x-ray source 24. As used herein, "focally aligned" and the like refer to sensor elements being disposed along an axis corresponding to (e.g., the path is oriented in the same direction as, even if not coincident with) a direct path from x-ray source 24 such that a beam emanating from source 24 would pass longitudinally through each sensor element on the focally aligned axis. FIG. 2 illustrates that the focal axis 25 is aligned along a representative x-ray beam path from x-ray source 24; sensor element axis 5 is vertically offset (in the cross-sectional view shown in FIG. 2) from focal axis 25 but oriented in a direction corresponding to the focal element axis. In the plan view shown in FIG. 1, focal axis 25 and sensor element axis 5 coincide as both are pointed in the direction of x-ray source 24. Thus sensor element axis 5 is oriented to be parallel to focal axis 25.

Each of the sensor elements 22 comprise at least one photosensor device 23, typically a photodiode. In one embodiment of the present invention, each sensor element 22 comprises sixty-four photosensitive diodes; for ease of illustration, only four photosensitive diodes 23 are shown in the figures. Each respective sensor element generally has the same number of photosensitive diodes. The diodes of each sensor are electrically coupled together in a parallel circuit arrangement to be described subsequently with relation to FIG. 6.

In accordance with the present invention detector 20 is robust and offers high resolution. "Robust" and the like is used herein to refer to a detector constructed in a fashion to provide reliable service over and extended period of operation. Resolution of detector 20 is a function of many factors, discussed in greater detail below, but several of which pertain to the number of photosensors available to detect light generated in the scintillator and the coupling of the scintillator to the detector array to ensure that detected light is closely spatially correlated with the location in the scintillator at which the light was generated by the absorption of the x-ray.

One of the means for providing a robust detector having high resolution is the use of large area arrays of deposited thin film semiconductor photosensors. The deposited thin film semiconductor photosensors comprise a material selected from the group consisting of hydrogenated amorphous silicon; hydrogenated amorphous germanium; fluorinated amorphous silicon; fluorinated amorphous germanium; alloys of silicon and germanium; and polycrystalline silicon, such thin film semiconductor photosensors are fabricated from hydrogenated amorphous silicon. "Deposited" and the like refer to the fabrication of the semiconductor devices through successive depositions that are known in the art of forming large are thin film semiconductor devices. For example, the materials can be deposited in a chemical vapor deposition process and patterned as necessary to form the desired components in an array.

In one advantageous embodiment this invention, sensor elements 22 comprise hydrogenated amorphous silicon (hereinafter referred to only as amorphous silicon or a-Si) and are typically fabricated using technology for forming large area thin film arrays. Use of amorphous silicon for fabricating the photosensor array for detector 20 presents advantages over crystalline silicon. Thin film deposition technology allows the fabrication of a large array of respective relatively small diodes on a single substrate; this arrangement avoids packaging problems and provides an effective large active area responsive to incident light. This arrangement further provides for the numerous diode structures in a compact area. Amorphous silicon further has a larger band gap and lower carrier mobility and thus typically exhibits reduced leakage current compared to crystalline silicon diodes.

Another advantage of the use of amorphous silicon is that common defects in the photosensor array (e.g., short circuits between conductive components and the like) are readily repaired with laser ablation techniques. An additional advantage of the use of amorphous silicon is that X-ray radiation does not damage amorphous silicon devices as much as it damages single crystal devices. Collectively these advantages improve both the performance of the detector 20 and the efficiency of array fabrication.

By way of example and not limitation, in one embodiment detector 20 used for industrial CT purposes (e.g., imaging turbine parts) comprises 2048 focally aligned sensor elements 22 in array having a pitch of 100 microns (or $\mu$n) (i.e., separation between adjacent sensor elements). Larger or smaller numbers of sensor elements can be used in detector 20 depending upon the particular use for imaging apparatus 45. Each sensor element 22 comprises sixty-four separate diodes, each having nominal dimensions of about 100 $\mu$m width by about 500 $\mu$m length. The length of the array of sensor elements is approximately 32 mm. The sensors are disposed along a respective focal axis 25 and have a length of approximately 32 mm so as to absorb the x-rays from the source 24 operating at a voltage of 200 kilovolts or greater, and typically at a voltage in the range of 200–700 kilovolts. Higher peak source voltages may require the sensor elements 22 to have a greater length.

As illustrated in FIG. 1, components of imaging apparatus 45 are arranged such that x-rays 26 emanating from high voltage x-ray source 24 are directed to be incident on a test object 28 to be imaged. X-rays that pass through object 28 represent the object due to the relative attenuation of the x-rays passing through different portions of the object. For purposes of illustration only, an x-ray attenuation pattern 30 of a region of interest of the test object 28 is shown in FIG. 1; as the attenuation pattern merely represents those x-rays that have passed through the object, the pattern cannot be viewed, displayed, or processed at this portion of apparatus 45 (that is, the attenuation pattern must be detected as described below). The attenuation pattern is typically a function of the cavities, variations in thickness, variations in material types, and the like of the test object 28. The attenuation pattern is used here to describe a spatial variation in x-ray intensity due to absorption or scattering of incident x-rays by the test object 28.

In one embodiment of the present invention, slit collimator 32 is disposed between x-ray source 24 and detector 20 so that, upon exiting the test object 28, the x-rays of attenuation pattern 30 are incident on scintillator 34. Collimator 32 thus determines the resolution of imager apparatus 45 in the z-axis, as that term is commonly used in the CT art. Collimator 32 typically comprises a material that is opaque (that is, does not pass the x-rays), or nearly so, to the high voltage x-rays; commonly a plate of tungsten having a thickness of about three-fourths of an inch is used to form collimator 32. The slit constitutes a narrow opening in the collimator plate and typically has a height in a range between about 50 microns and about 1000 microns (and commonly in a range between about 50 microns and 250 microns) and a length comparable to the width of the array of sensors of FIG. 1. In an alternative embodiment, a second collimator (not shown) is disposed between x-ray source 24 and test object 28.

A portion of the x-rays passing through test object 28 also pass through the slit of the collimator 32 and thence pass into scintillator 34. The x-rays are absorbed in scintillator 34 in events that result in the generation of optical photons. Scintillator 34 is typically disposed over sensor elements 22 so that light generated in the scintillator is optically coupled to sensor elements 22 (as used herein, "over", "above" and the like are used merely for orientation with respect to the relative location of components illustrated in the figures and is not meant to imply any limitation with regard to the orientation or operation of the imager device when in use). Thus, the x-ray pattern 30 representing object 28 is converted to visible light which in turn impinges upon sensor elements 22 in detector 20. The incident light is converted to an electrical signal that is representative of the light absorbed. (e.g., by accumulation of charge on respective diodes) by the photodiodes in sensor elements 22.

The accumulated charge on the diodes is read out by an array of amplifiers 38. For optimum efficiency there is desirably one amplifier for each sensor element 22. These amplifiers can be, for example, charge integrating amplifiers or alternatively current to voltage amplifiers followed by an integrating stage. The total charge incident on each sensor element during any desired period of time is sampled using these amplifiers and the resulting data transmitted to a data processor 40 for presentation or further computation.

The data produced, from one position of the slit collimator 32 with respect to the test object 28, represent a view of a single slice of (that is, the data represent information regarding one plane disposed through) test object 28. The data for one view of the single slice are referred to as a frame. For computed tomography, many frames of data are taken at different angles through the test object 28 for a single slice. Data processor 40 is typically programmed to control operation of the apparatus 45 for changing the relative arrangement of object 28 with respect to x-ray source 24 and collimator 32 for obtaining different views. Processor 40 further is configured (e.g., programmed) to manipulate the digital data of the collection of frames into a useful image that is presented on a display 42. Such display 42 may be an electronic display, a hard copy print out, or any other kind of display that is visible or otherwise useful to human beings.

Each sensor element 22 is disposed in detector 20 so as to be focally aligned to the high voltage x-ray source 24. The respective focal axes 25 are each oriented longitudinally through the respective photosensors 23 in a given sensor element 22 so as to point to high voltage x-ray source 24. Each sensor element 22 has a number of photosensors 23 disposed along its respective focal axis 25 and a corresponding section of scintillator disposed over the these photosensors 23. The dimension of the scintillator along the focal axis is sufficiently long so as to absorb the majority of x-rays passing through the test object and the collimator that are incident on the scintillator.

FIG. 2 presents a cross-sectional view of part of the apparatus 45 of FIG. 1 along line A—A. The high voltage x-ray source 24 emits x-rays 26 which pass through object 28 to the slit collimator 32. Most of the x-rays are absorbed by the tungsten collimator 32 but some rays pass through a narrow slit 40 to impinge on detector assembly 20.

The size of slit 40 in collimator 32 is selected to provide a desired vertical resolution. The resolution in the horizontal direction is limited by the pitch of sensor elements 22. In addition to the resolution of the image in the z-axis that is provided by collimator 32, imager apparatus 45 further provides resolution in the image plane defined by the respective focal alignment axes 25. This spatial. resolution is provided in part in one embodiment of the present invention by a light-guiding scintillator, such as fiber optic scintillator 34 that has a relatively large number of optical fibers per diode. In this arrangement, x-rays 133 passing through collimator 32 are incident upon fiber optic scintillator 34, which comprises a large number of optical fibers bundled together. The optical fibers have an optical axis 35 that is oriented generally orthogonally to the path of the incident x-rays 133 passing through collimator 34. High voltage x-rays absorbed in scintillator 34 are converted to visible light, and the optical photons generated generally pass along the respective optical axis 35 of a respective fiber where the absorption took place towards the underlying sensor element 22, where it is detected by respective photosensitive diodes. The magnitude of charge accumulated in the photodiodes is proportional to the intensity of the high voltage x-rays passing through the slit collimator 32 and that are absorbed in the scintillator. The quantity of charge is read out of the photosensitive diodes and processed, as described with respect to FIG. 1. Many frames of data are taken and processed into an internal image of the object 28.

For example, one type of fiber optic light guiding scintillator material that can be used is provided by Collimated Holes, Inc. of Campbell, California. This material is typically provided in 4 inch by 4 inch sheets with lengths of fibers up to 25 mm in thickness corresponding to the dimension "D" in FIG. 2 and dimension "T" in FIG. 3 (an example of such a material is part no. LKH-06 from Collimated Holes, Inc.) Pieces of this fiber optic scintillator material can be coupled together to provide a scintillator structure 34 that has dimensions corresponding with a desired arrangement of sensor elements 22. For example, typically sensor elements 22 have a length dimension "L" in FIG. 1 in the range between about 1 and about 35 mm, and commonly about of about 32 mm; two or more pieces of the fiber optic scintillator material are cut and assembled together to cover the desired dimensions of sensor elements 22. The depth that is, the length of the scintillator (dimension "L") along the direction of the x-ray focal axis of fiber optic scintillator along the focal axis (that is, the distance through which an incident xray could travel within the scintillator) is typically in the range of about 5 mm. Each of the scintillator optical fibers further exhibits an emission bandwidth (that is, generates optical photons in response to absorption of an x-ray) in a wavelength range of approximately 20 nanometers, with the center of that emission bandwidth being within a range of wavelengths between about 530 nanometers and about 550 nanometers.

The individual fiber diameters are in the range between about 5 microns and about 25 microns, providing a large number of fibers overlying each photosensor 23 in sensor element 22 (the fibers are typically tightly packed together so that adjoining fibers contact one another, thus letting the fiber diameter effectively determine the number of fibers that can be disposed over the surface area of a photosensor 23 (the fiber optic axes 35 are oriented vertically in the plane of the drawing of FIG. 2). The optical fibers serve to direct at least a portion of the light generated from the absorption of incident x-rays towards the underlying sensor element 22 and limits the light from spreading out laterally within scintillator 34 since at least a portion of the light is confined to the fibers by total internal reflection. The length (the dimension "D" in FIG. 2 of the fibers in scintillator 34 is typically several millimeters (e.g., about 6 mm in one embodiment). This arrangement enables imaging apparatus 45 to provide relatively high resolution images (e.g., for a 100 $\mu$m pitch, about 5 lp/mm).

Figure 3:
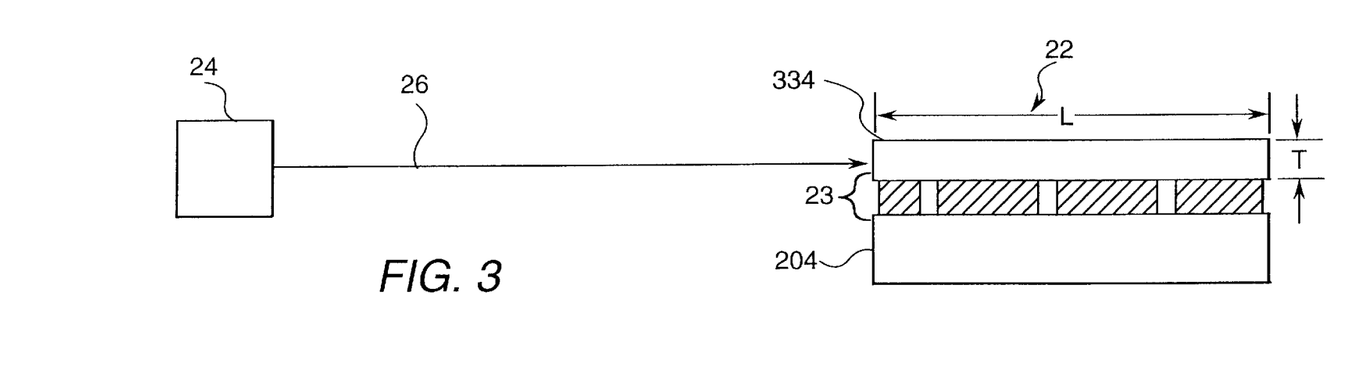
FIG. 3 is a partial block diagram and partial cross-sectional view of an imaging apparatus in accordance with a second embodiment of the present invention.

The length of the optical fibers in scintillator 34 (e.g., dimension "D" in FIG. 2 which dimension corresponds to the thichness "T" of a block scintillator as illustrated in FIG.3) provides some versatility for imager apparatus 45 in the event of radiation damage to the scintillator (e.g., the ability of the scintillator to absorb the incident radiation and generate corresponding optical photons is reduced after extended operation). In such a situation, the relative position of the slot 40 of collimator 32 can be displaced relative to a former position with respect to scintillator 34. Thus, changing the dimension "D", can be used to keep incident x-rays 133 within a high sensitivity region of the scintillator 34.

In an alternative embodiment of the present invention as illustrated in FIG. 3, imager apparatus 45 is otherwise similar to the device described above except that collimator 32 is not used and a scintillator 334 comprises a relative thin sheet of scintillator material that does not have optical fibers. Typically scintillator 334 comprises a common non-light guiding (that is, the generated optical photons can spread in all directions) scintillating medium such as cesium iodide or the like; trade names of other scintillator products that can be used include "Lumex," and "Lanex." Scintillator 334 is disposed over the array of photosensors 23 in sensor element 22 such that the length "L" of the scintillator substantially is the same as the corresponding dimension of sensor element 22 as shown in FIG. 3. Resolution in the z-axis is provided by the thickness "T" of the scintillator, which thickness is selected to be thin enough to obviate the need for a separate collimating (that is, the thickness of scintillator 334 inherently limits the x-rays detected to a desired resolution along the z-axis). Thickness "T" is typically in the range between about 100 microns and 100 microns. Resolution in the plane of the detector surface is provided by the underlying array of photosensors 23; given the relative narrow thickness of scintillator 334, light generated in the scintillator does not spread laterally (that is, along length axis "L") to a great extent before being detected by the underlying photosensors 23.

Figure 4:
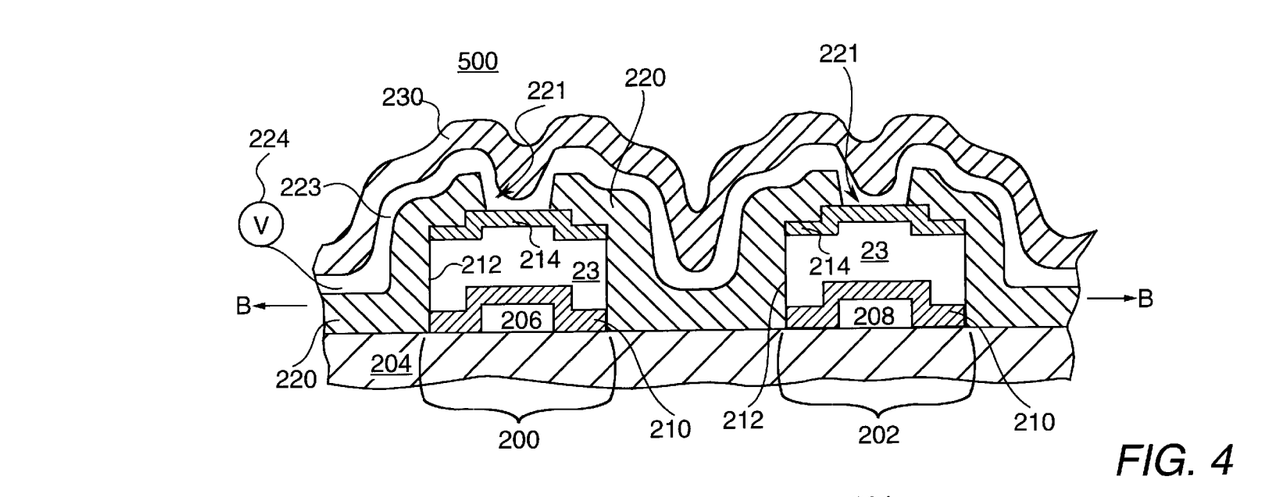
FIG. 4 is a cross-section of two sensor elements fabricated in amorphous silicon.

FIG. 4 is a cross-section of a part of an amorphous diode array 500 showing a cross sectional view of two representative photosensors 23 located in adjacent sensor elements 22, which are identified in FIG. 4 with numbers 200, 202. The photosensitive diodes are fabricated on a substrate 204 such as glass. Respective sensor element 200, 202 metallic conductor strips 206, 208 (commonly referred to as data lines) are disposed on substrate 204 for connecting with the cathode terminal of each respective diode in each sensor element 22. By way of example and not limitation, an approximately 50nm thick layer of n-type conductivity silicon 210 is disposed over the respective sensor element conductor strips 206, 208. A layer of undoped amorphous silicon 212 is disposed over the n-type silicon layer 210; undoped layer 212 has a thickness of about 1,500 nm. A layer of p-type doped silicon 214 is disposed over the undoped silicon layer 212. These layers are patterned and etched producing the individual diode regions 23 of each sensor element 22 of FIG. 1. A dielectric material layer 220 is deposited, patterned, and etched to passivate and protect the sidewalls of the diodes. Dielectric material layer 220 may comprise one or more respective layers of dielectric material, such as an inorganic dielectric material (e.g., silicon oxide or silicon nitride) and a layer of organic dielectric material (e.g., polyimide).

The fabrication pattern and etch process also is used to fabricate respective via holes 221 to permit electrical contact to the upper conductive layer 214 of each diode. A common electrode 223 comprising a layer of transparent conductive material such as indium tin oxide (ITO) is disposed over the array and patterned so as to provide a common electrical contact to each photosensor 23 in the array. Common electrode 223 commonly is electrically coupled to a bias source 224. Array 500 further typically comprises a protective layer 230 comprising passivation material, such as organic or inorganic dielectric material.

Figure 5:
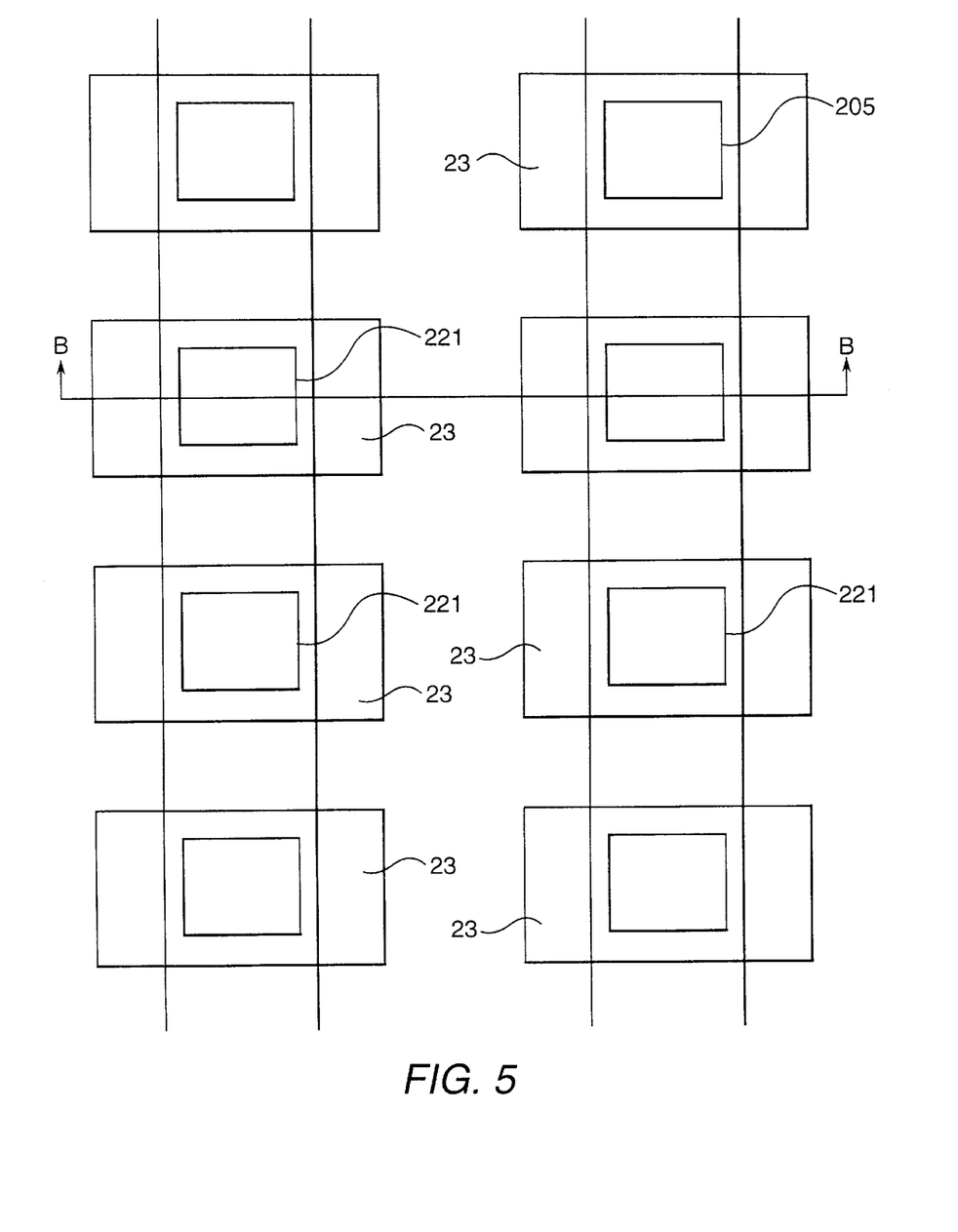
FIG. 5 is a plan view of portions of two photosensitive diode detector elements with an indication of where the cross-section of FIG. 4 is taken.

Each photosensitive diode island 23 typically has dimensions of about 100 microns across (in the plane of the drawing) the 500 microns long (normal to the plane of the drawing). FIG. 4 shows a side view along the line B—B of FIG. 5 of two adjacent sensor elements 200, 202 of FIG. 4, with each sensor element composed of a multiplicity of diode elements 23. For simplicity only the metal line 206 and the diode island element 205, and via holes 221 are shown.

Figure 6:
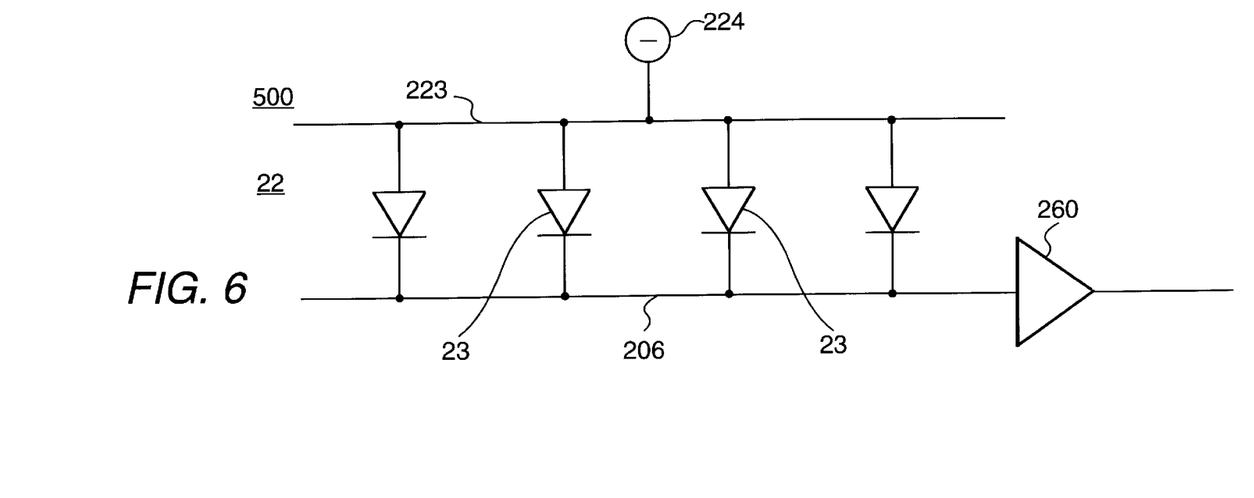
FIG. 6 is a schematic diagram of diode connections within a single sensor element.

FIG. 6 shows a schematic diagram of the parallel circuit connection arrangement of the photosensitive diodes for one sensor element 22 (e.g., sensor element 200 of FIG. 4). Each diode 23 in a respective sensor element 22 is electrically coupled in parallel to data line 206 which is coupled to a readout amplifier 260. The diodes are similarly electrically coupled in parallel to common electrode 223 that is illustrated being coupled to bias source 224. The parallel connection of photodiodes 23 allows the array 500 to be repaired by disabling of any given diode that has a defect (such as a short circuit, or unacceptable leakage), typically by breaking the electrical connection to common electrode 223 (usually accomplished with laser ablation). Removal of a defective diode from the circuit is acceptable because the total gain, or the x-ray sensitivity, of the affected sensor element 22 changes by only a few percent with the loss of the diode. A defective diode usually can be identified by visual inspection following an electrical test indicating excess leakage from a specific diode sensor element.

Figure 7:
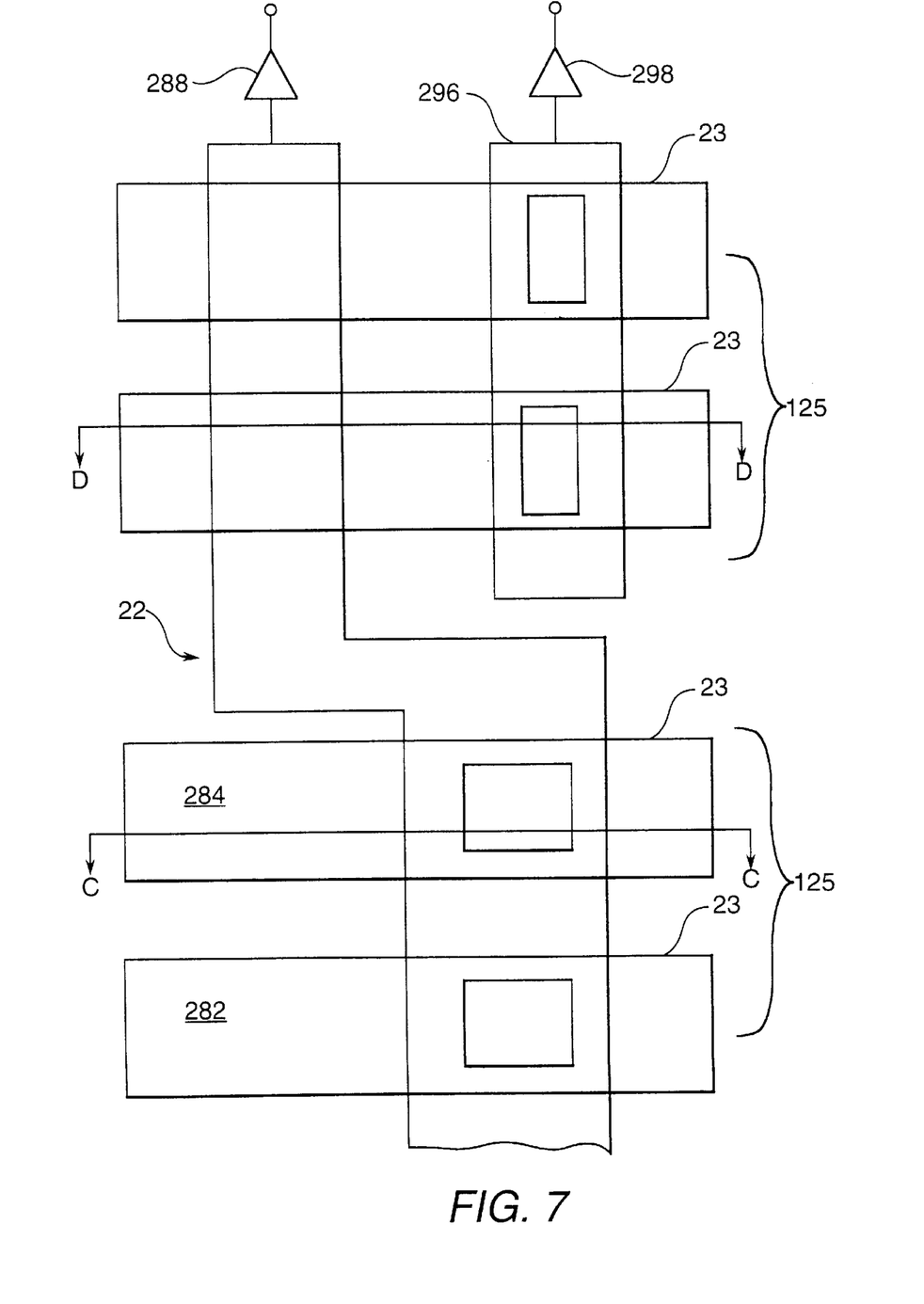
FIG. 7 is a plan view of a portion of an alternative embodiment of a sensor element in accordance with this invention having at least two sensor segments, with an indication of where two cross-sections are taken for FIGS. 9 and 10.

Sensor element 22 may alternatively comprise photosensors 23 arranged as illustrated in FIG. 7. In this embodiment, sensor element 22 is partitioned into a plurality of sensor segments, including at least a first sensor segment 120 and a second sensor segment 125. Representative first sensor segment photosensors 282 and 284 are coupled in parallel to a first data line 286, and via first data line 286 to the input of a first sensor segment amplifier 288. Representative second sensor segment photosensors 292 and 294 are coupled in parallel to a second segment data line 296 and via second data line 296 to the input of a second sensor segment amplifier 298.

Figure 8:
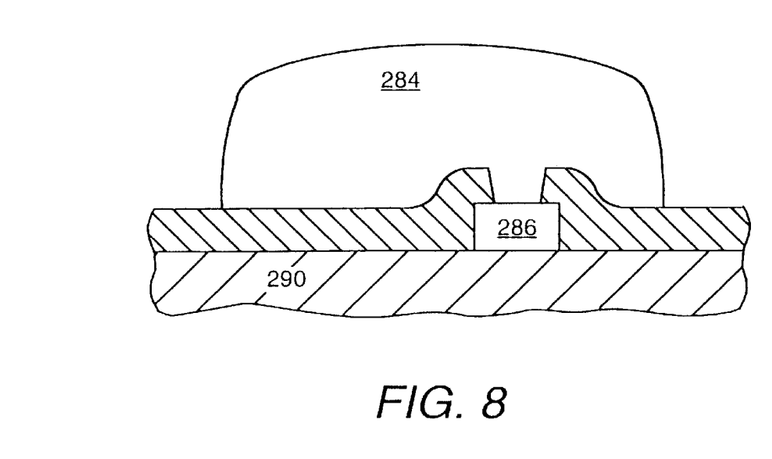
FIG. 8 is a partial cross-section of FIG. 7 taken along C—C.
Figure 9:
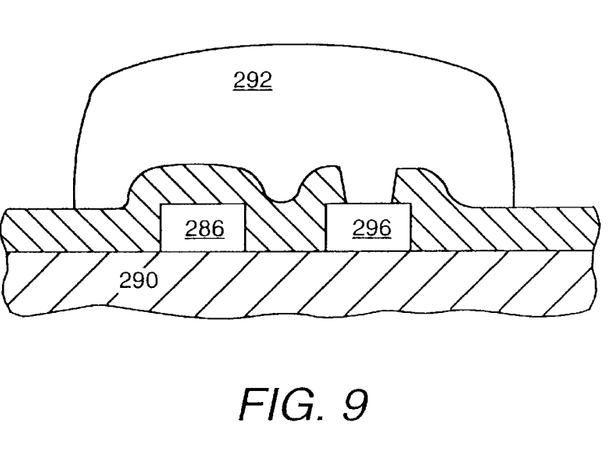
FIG. 9 is a partial cross-section of FIG. 7 taken along D—D.

FIGS. 8 and 9 show cross-sections of the first sensor segment photosensor 284 and second sensor segment photosensor 292 along lines C—C and D—D of FIG. 7 respectively. Both first and second segments 120, 125 are disposed on a single substrate 290. The diode structures in FIGS. 8 and 9 are only outlined versions of multiple tiers of the semiconductive material, dielectric material, and conductive material layers for ease of illustration, while illustrating the conductive strapping arrangement of first and second data lines 286 and 296.

Figure 10:
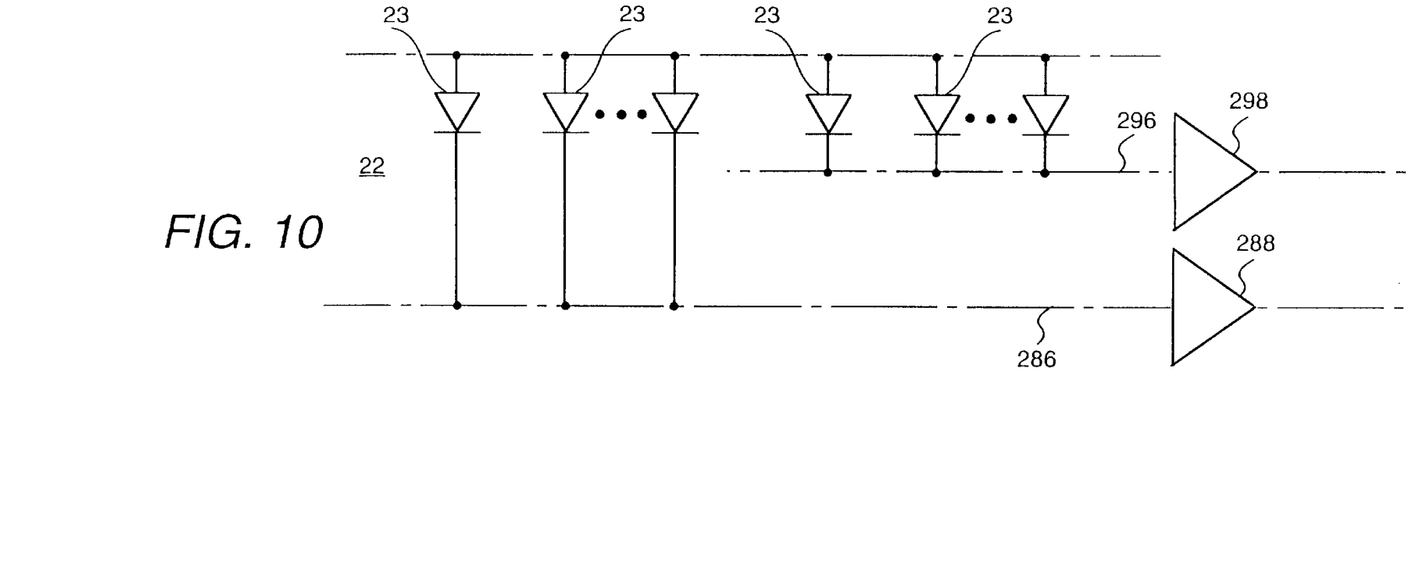
FIG. 10 is a schematic of the circuit for the alternative embodiment a sensor element having two sensor segments.

A schematic diagram of the arrangement of a multiple-data line arrangement 286, 296 (of FIG. 7) is shown in FIG. 10, showing the diodes of the two parts of a single photo-sensitive diode sensor element 22 interconnected with separate amplifiers. Each respective first and second portion 120, 125 comprises a plurality of diodes 23 electrically coupled together in a respective parallel circuit arrangement.

One advantage of an imaging apparatus 45 having multiple data lines coupled to respective readout amplifiers is that the detector output provides energy discrimination. The multiple data line and amplifier arrangement will generate signals corresponding to absorption of incident x-rays along the length of sensor element 22. Lower energy x-rays have a shorter range in scintillator 34 (that is, they are absorbed after few interactions with the scintillator material); the absorption of the lower energy x-rays thus produces a signal in sensor element 22 mostly in the first few, or front, diodes of a photosensor element 22 (e.g., first sensor segment 120 as illustrated in FIG. 7). Higher energy x-rays are absorbed along the entire length of the scintillator overlying sensor element 22 and thus result in a signal being generated along the length of sensor element 22 (e.g., in both first sensor segment 120 and second sensor segment 125 as illustrated in FIG. 7). The plurality of amplifier signals corresponding to respective segments of the sensor element 22 provide some energy discrimination which is useful for dual energy computed tomography, e.g., to enable discrimination between materials having different atomic numbers, and to compensate for computed tomography image artifacts due to beam hardening.

Figure 11:
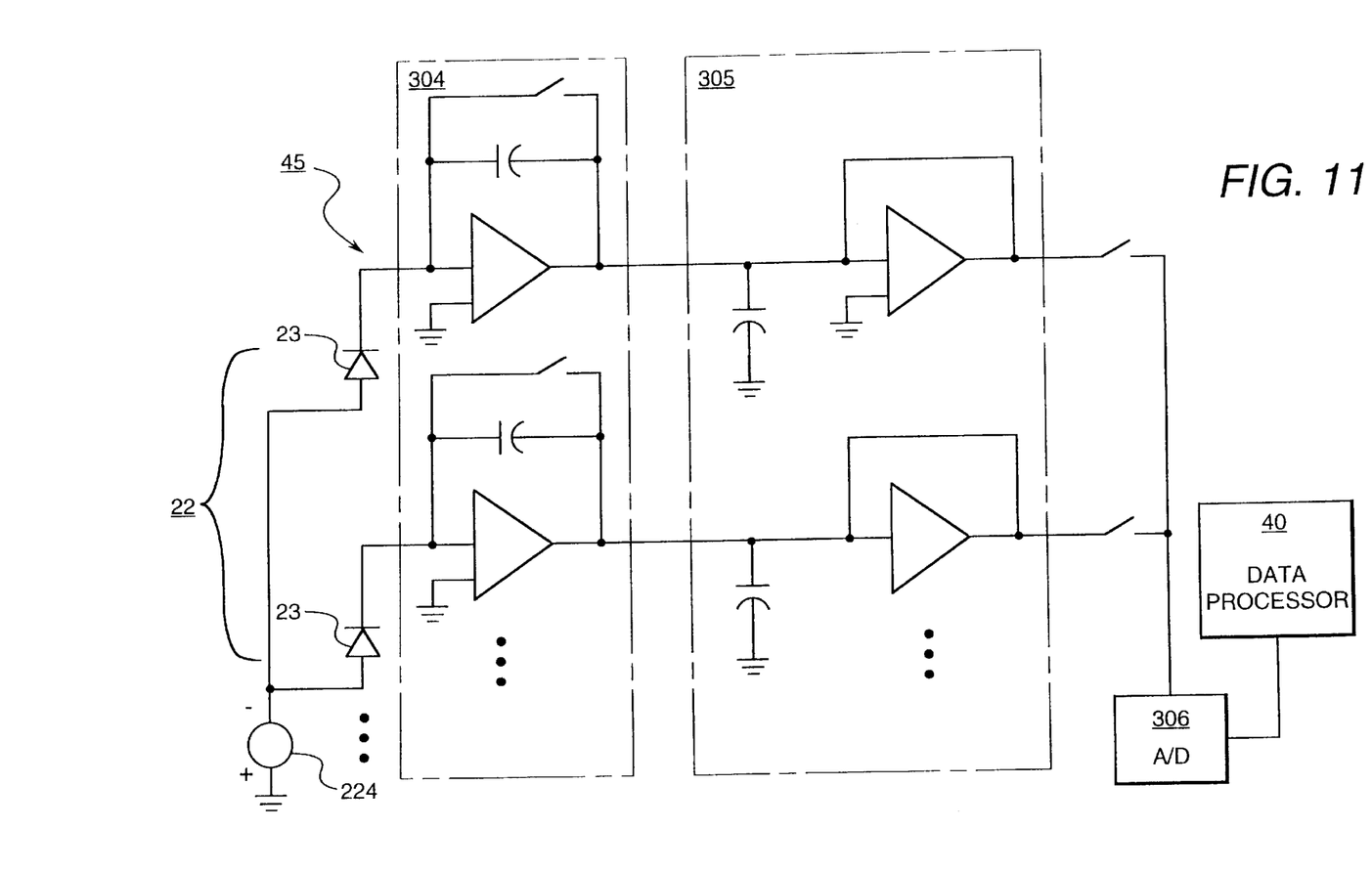
FIG. 11 presents a block diagram schematic of photosensitive diode sensor elements interconnected with processing circuitry for collecting and analyzing detected signals.

A further embodiment of the imaging apparatus 45 of the present invention comprises a plurality of charge amplifiers 304, each of which is coupled to a respective photosensor 23 in sensor element 22 (FIG. 11). Each diode is further coupled via its common electrode 223 to a bias source 224. Apparatus 45 further comprises plurality of sample and hold circuits 305, with each charge amplifier 304 being coupled to a respective sample and hold circuit 305. Sample and hold circuits 305 are coupled to an analog-to-digital converter 306 that provides switching to data processor 40.

Figure 12:
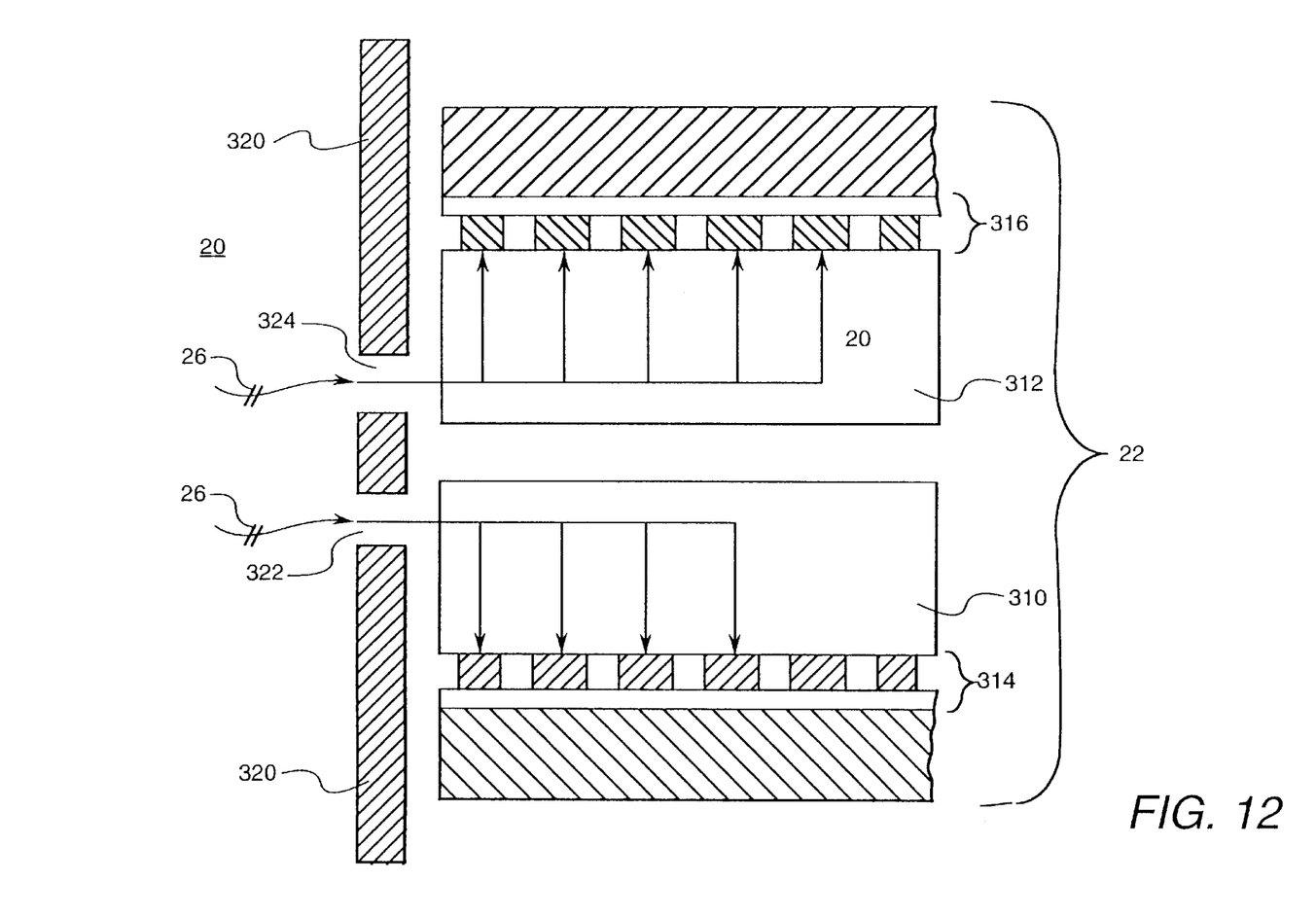
FIG. 12 shows another embodiment of the detector for two simultaneous computed tomography slices.

Another embodiment of detector apparatus 45 in accordance with the present invention for providing two simultaneous computed tomography slices comprises respective scintillator and sensor element segments, as illustrated in FIG. 12. Detector 20 in this embodiment comprises at least a first scintillator 310 and a second scintillator 312 and a respective first sensor module 314 and a second sensor module 316. In each sensor element 22, second scintillator 312 and second sensor module 316 are disposed above (that is, along a direction corresponding to the axis of the optical fibers) first scintillator 310 and its associated first sensor module 314. Slit collimator 320 further comprises a first slit 322 and a second slit 324 that are oriented to allow passage of a portion of incident x-rays 26 onto first scintillator 310 and second scintillator 312 respectively. This arrangement provides for dual-slice computed tomography capability.

As set forth above with respect to specific embodiments, imaging apparatus 45 in accordance with the present invention is adapted to provide high resolution CT images. The resolution of the detector is determined by x-ray scatter and fluorescence, high energy electron scattering, and light spread within the scintillator. Additional resolution limitations can be due to the geometry of the relative locations of the object, the source, and the detector, and a finite x-ray source size. For example, analysis of models of an apparatus of the present invention as illustrated in FIGS. 1 and 2 provides the following information: at a source to detector distance of about 23 inches, this detector has a modulation transfer function of 0.5 at 3 lp/mm and a useful resolution of more than 6 lp/mm. Prior art xenon detector technology has no response at 3 lp/mm.

While the invention has been described herein with reference to specific embodiments and features, it will be appreciated that the utility of the invention is not thus limited but encompasses other variations, modifications, and alternative embodiments, and accordingly the invention is therefore to be broadly construed as comprehending all such alternative variations, modifications, and other embodiments within its spirit and scope.

What is claimed is:

1. A high resolution and robust radiation imager apparatus for generating computed tomography (CT) images of an object to be imaged with x-rays emanating from an x-ray source, said imaging apparatus comprising:

a detector assembly comprising a plurality of sensor elements optically coupled to a scintillator; each of said plurality of sensor elements further comprising a respective plurality of thin film deposited semiconductor photosensors disposed in a linear array pattern along a respective sensor element axis;

the respective sensor element axis of each of said plurality of sensor elements further being offset from a direct path focal axis of x-rays passing from said x-ray source but oriented in a direction parallel to said focal axis with respect to said x-ray source;

said scintillator comprising a fiber optic scintillator having a plurality of optical fibers bundled in an array and disposed such that said x-rays are incident on said fiber optic scintillator substantially perpendicular to the respective optical axes of said plurality of optical fibers;

said fiber optic scintillator further being optically coupled to at least one of said sensor elements such that said sensor elements is disposed at one end of the plurality of optical fibers.

2. The imager apparatus of claim 1 wherein said thin film semiconductor photosensors comprise a material selected from the group consisting of hydrogenated amorphous silicon; hydrogenated amorphous germanium; fluorinated amorphous silicon; fluorinated amorphous germanium; alloys of silicon and germanium; and polycrystalline silicon.

3. The imager apparatus of claim 1 wherein the length of said optical fibers is in the range between about 2 mm and about 25 mm.

4. The imager apparatus of claim 1 wherein said fiber optic scintillator is disposed to absorb x-ray radiation incident on said fiber bundles and direct at least a portion of the optical photons generated in an absorption event along the optical axis of fibers in the vicinity of said absorption event.

5. The imager apparatus of claim 4 wherein said bundle of optical fibers has a dimension of about 5 mm or greater along the respective focal axis of the sensor element coupled to the optical fiber bundle.

6. The imager apparatus of claim 1 wherein the diameter of said optical fibers is in the range between about 5 microns and about 25 microns.

7. The imager apparatus of claim 1 wherein said thin film semiconductive photosensors disposed in a sensing array comprise a plurality of photodiodes electrically coupled together in parallel.

8. The imager apparatus of claim 7 wherein said plurality of photodiodes are disposed substantially in a linear array oriented along said sensor element axis.

9. An apparatus for generating images of an object exposed to x-ray radiation, the apparatus comprising:

a high voltage x-ray source for producing and x-ray beam at a voltage of at least about 200 kilovolts;

a plurality of sensor elements arranged in an array, each of said sensor elements comprising a plurality of photosensors aligned along a sensor element axis, said sensor element axis being offset from a direct path focal axis of x-rays passing from said x-ray source but oriented in a direction parallel to said focal axis with respect to said high voltage x-ray source;

a light-guiding scintillator optically coupled to said plurality of sensor elements and disposed to receive incident x-rays that have passed from said x-ray source through the object to be imaged, said light guiding scintillator comprising an array of optical fibers disposed such that the optical axis of said fibers is substantially perpendicular to the path of x-rays incident on said scintillator; and a collimator disposed between said x-ray source and said scintillator, said x-ray path determining the portion of said object that is imaged.

10. An apparatus in accordance with claim 9 wherein each of said sensor elements comprises a photodiode array.

11. An apparatus in accordance with claim 10 wherein said photodiodes are disposed in respective sensor element linear arrays within each respective sensor element and are optically coupled to an overlying portion of said scintillator.

12. An apparatus in accordance with claim 10 wherein said photodiodes are electrically coupled together in at least a first sensor segment and a second sensor segment, each of said photodiodes in each respective sensor segment being electrically coupled to a respective segment data line and to a common electrode.

13. An apparatus in accordance with claim 12 wherein each respective sensor segment is disposed sequentially along the respective sensor element axis such that photodiodes in each sensor segment generate signals corresponding to detection of incident x-rays absorbed in the portion of said scintillator optically coupled to said respective sensor segment.

14. An apparatus in accordance with claim 11 wherein said photodiodes disposed in a respective sensor element are electrically coupled in parallel to a common electrode so as to facilitate electrical isolation of a respective diode by severance of the respective diode's connection to said common electrode.

15. The apparatus of claim 9 wherein each of said sensor elements comprises an array of thin film deposited semiconductor photosensors optically coupled to said scintillator, said array of photosensors being aligned along said focal axis of said sensor element so as to receive optical photons generated by said scintillator disposed over the length of said array.

16. An apparatus in accordance with claim 15 wherein said thin film semiconductor photosensors comprise a material selected from the group consisting of hydrogenated amorphous silicon; hydrogenated amorphous germanium; fluorinated amorphous silicon; fluorinated amorphous germanium; alloys of silicon and germanium; and polycrystalline silicon.

17. An apparatus in accordance with claim 15, wherein the optical fibers comprising said light-guiding scintillator have a length in a range between about one millimeter and about twenty-five millimeters long.

18. An apparatus in accordance with claim 15 further comprising readout electronics electrically coupled to said photosensor array for processing the electrical signal generated by said photosensors in response to the absorbed x-rays incident on said scintillator.

19. An apparatus in accordance with claim 9, wherein each of said optical fibers in said light-guiding scintillator have a first end and a second end, said scintillator being disposed with respect to said collimator such that the path of x-rays incident on said scintillator intersects said collimator optical fibers nearer to the fibers first end than to the fiber's second end, said second end of said scintillator optical fibers being coupled to said sensor element.

20. An apparatus in accordance with claim 14, wherein said collimator comprises a slit through which x-rays passing from said object must pass before being incident on said scintillator;

said slit having a first dimension oriented along the optical axis of said scintillator optical fibers in the range between about 50 micrometers and about 500 micrometers high and having a second dimension orthogonal to said first dimension, said second dimension having a value corresponding to the extent of the lateral dimension of said array of sensor elements.

21. An apparatus in accordance with claim 9, wherein each of said scintillator optical fibers has an emission bandwidth in a wavelength range of approximately 20 nanometers, the center of said emission bandwidth being within a range of wavelengths between about 530 nanometers and about 550 nanometers.

* * * * *